United States Patent [19]
Richards et al.

[11] 3,735,694
[45] May 29, 1973

[54] ROLLING MACHINE FOR STUFFED MEAT "BIRDS" AND OTHER ROLLED ARTICLES

[75] Inventors: Louis R. Richards, Mokena; Henry N. Lekan, Chicago, both of Ill.

[73] Assignee: Formax, Inc., Mokena, Ill.

[22] Filed: Sept. 4, 1970

[21] Appl. No.: 69,562

[52] U.S. Cl............99/450.1, 425/139, 242/DIG. 3
[51] Int. Cl...............................................A22c 7/00
[58] Field of Search......................107/9 R, 9 B, 9 D, 107/10, 11, 12, 13, 34, 69; 18/9, 10, 11; 25/21; 100/155–159, 160, 161, 168; 242/DIG. 3; 72/146, 148

[56] References Cited

UNITED STATES PATENTS

| | | | |
|---|---|---|---|
| 2,691,351 | 10/1954 | Turner | 107/12 |
| 2,735,382 | 2/1956 | Hansen | 107/12 X |
| 2,965,050 | 12/1960 | Doering | 107/12 X |
| 3,225,717 | 12/1965 | Page | 107/69 |
| 3,596,613 | 8/1971 | Roth et al. | 107/27 R |
| 2,849,191 | 8/1958 | Gadler | 242/DIG. 3 |
| 3,382,542 | 5/1968 | Witshi et al. | 19/149 |
| 3,052,073 | 9/1962 | Johansen et al. | 242/DIG. 3 |
| 2,775,410 | 12/1956 | Schwartz et al. | 242/DIG. 3 |
| 2,881,984 | 4/1959 | Dyken | 242/DIG. 3 |
| 3,494,303 | 2/1970 | Shiffer | 425/109 |

*Primary Examiner*—G. V. Larkin
*Attorney*—Kinzer and Dorn

[57] ABSTRACT

A machine for rolling stuffed meat "birds" and other articles comprising an in-feed conveyor for feeding fat, pliable articles of low memory factor, such as meat patties, into a rolling station. A first power-driven roller blocks the path of the articles at the rolling station, deflecting the leading edge of the article upwardly; other power-driven rollers guide the article backwardly and downwardly so that the article is rolled upon itself. Gate means are provided to displace the first roller away from the end of the in-feed conveyor, when the article has been rolled, discharging the completed rolled article down onto a discharge conveyor.

6 Claims, 5 Drawing Figures

INVENTORS
LOUIS R. RICHARDS
HENRY N. LEKAN
BY
Kinyer, Dorn and Zickert
ATTORNEYS

INVENTORS
LOUIS R. RICHARDS
HENRY N. LEKAN

BY
Kinzer, Dorn and Zickert
ATTORNEYS

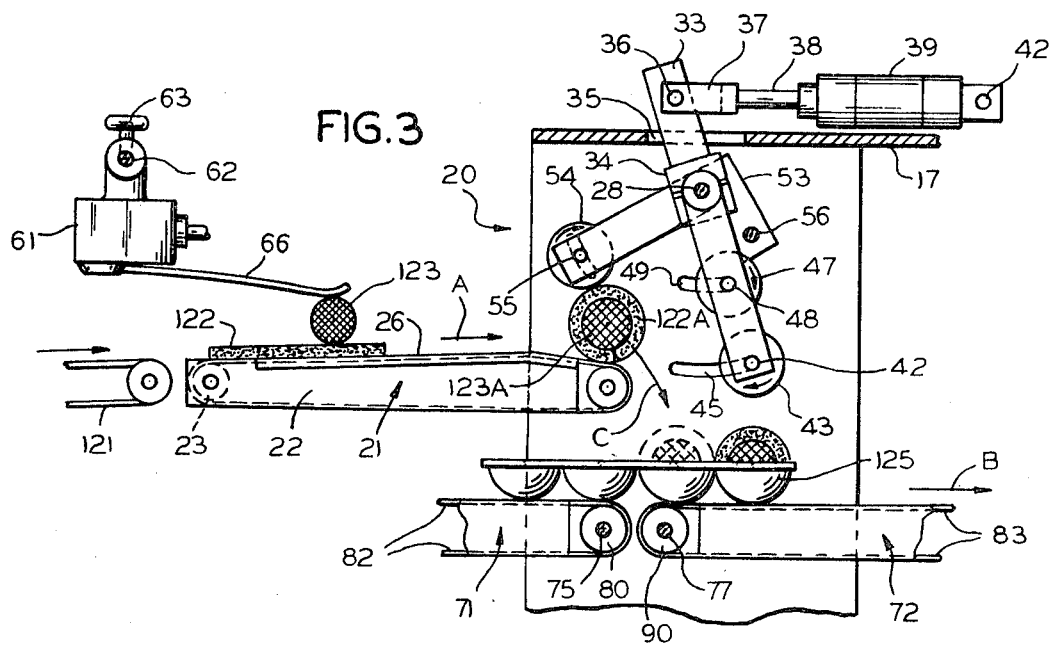
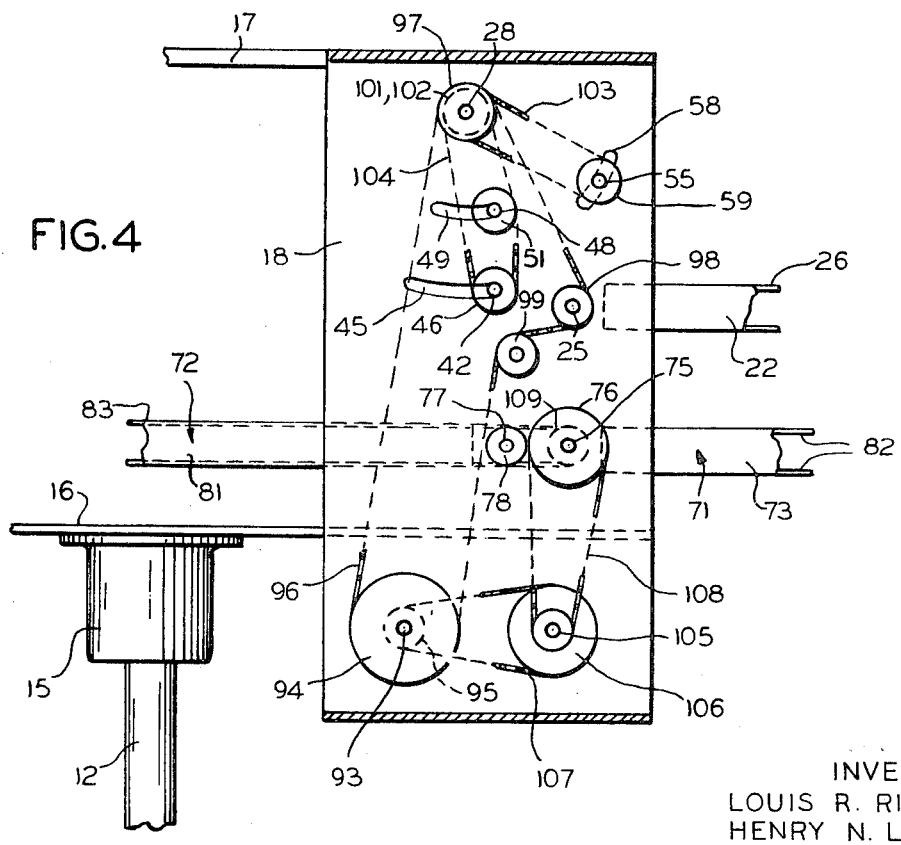

ROLLING MACHINE FOR STUFFED MEAT "BIRDS" AND OTHER ROLLED ARTICLES

BACKGROUND OF THE INVENTION

A meat "bird," in the pre-packaged food trade, comprises a meat steak or patty that has been rolled around a central core of stuffing. These "birds" are prepared and packaged and sold through retail outlets, usually in frozen form. But the preparation of this product presents substantial difficulties and considerable expense. When prepared by hand, the product is usually quite irregular, because the workers doing the preparation work cannot maintain uniformity in the size of the roll or in its shape. On the other hand, machines for rolling a product of this kind have not been generally available.

There are other instances in which it may be necessary or desirable to roll a flat, pliable article of low memory factor material to form a tubular configuration or a tight roll. In the food field, for example, it may be desirable to roll dough or meat into a tubular configuration for subsequent stuffing by the user. A non-food application with similar problems is the rolling of cloths soaked in hot water, affording the familiar Japanese-style "Oshibori." Equipment for performing these tasks has not generally been available.

SUMMARY OF THE INVENTION

A principal object of the present invention, therefore, is to provide a new and improved rolling machine for rolling flat, pliable articles of low memory factor in a rapid and efficient manner.

A particular object of the invention is to provide a new and improved rolling machine that is capable of rolling a steak or meat patty around a core of stuffing to form a meat "bird."

A further object of the invention is to provide a versatile rolling machine which, without substantial change, can be used for rolling meat products, wet cloths, and virtually any other flat pliable material of low memory factor into a controlled configuration that may be a tight roll or a tube, depending upon the material being processed and the adjustment of the machine.

A specific object of the invention is to provide a new and improved machine for rolling flat, pliable articles of low memory factor that is readily adaptable to immediate and essentially automatic packaging of the rolled articles as they are rolled.

BRIEF DESCRIPTION OF THE DRAWINGS

FIG. 3 is a sectional side elevation view of the principal operating components of the machine taken approximately along line 3—3 in FIG. 2;

FIG. 4 is a sectional elevation view taken approximately along line 4—4 in FIG. 2.

DESCRIPTION OF THE PREFERRED EMBODIMENT

Figure 1:
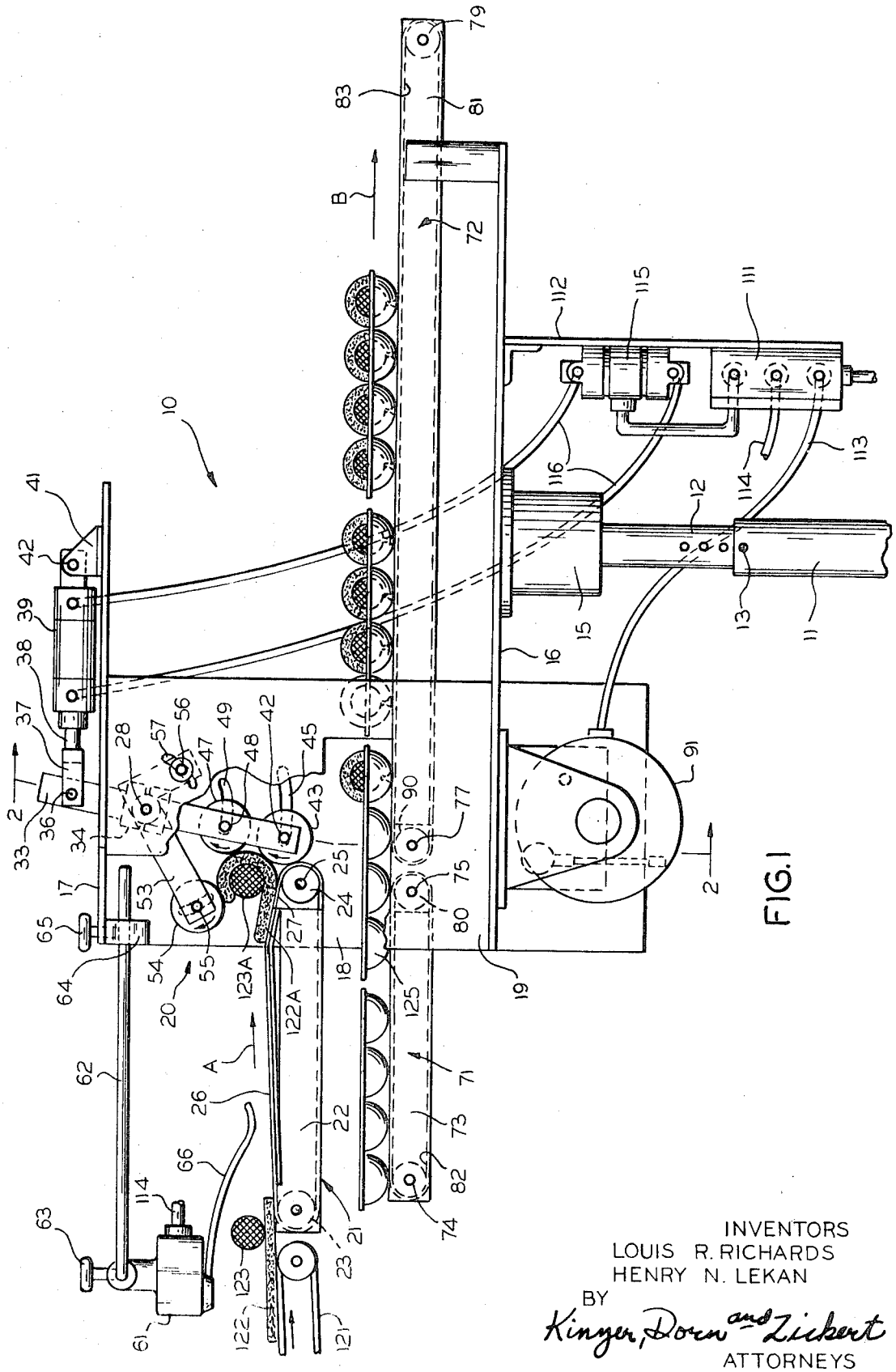
FIG. 1 is a side elevation view of a rolling machine constructed in accordance with one embodiment of the present invention, a part of the machine being cut away to show operating components.

FIGS. 1 through 4 illustrate a rolling machine 10 utilized in the rolling of stuffed meat "birds." The rolling machine 10 includes a supporting frame that comprises a base tube 11 into which an upper support tube 12 fits, the height of tube 12 within tube 11 being determined by a stop pin 13. The upper end of tube 12 has a mounting flange 15 affixed thereto. A base plate 16 is secured to mounting flange 15 and forms the base for the operating components of rolling machine 10.

Figure 2:
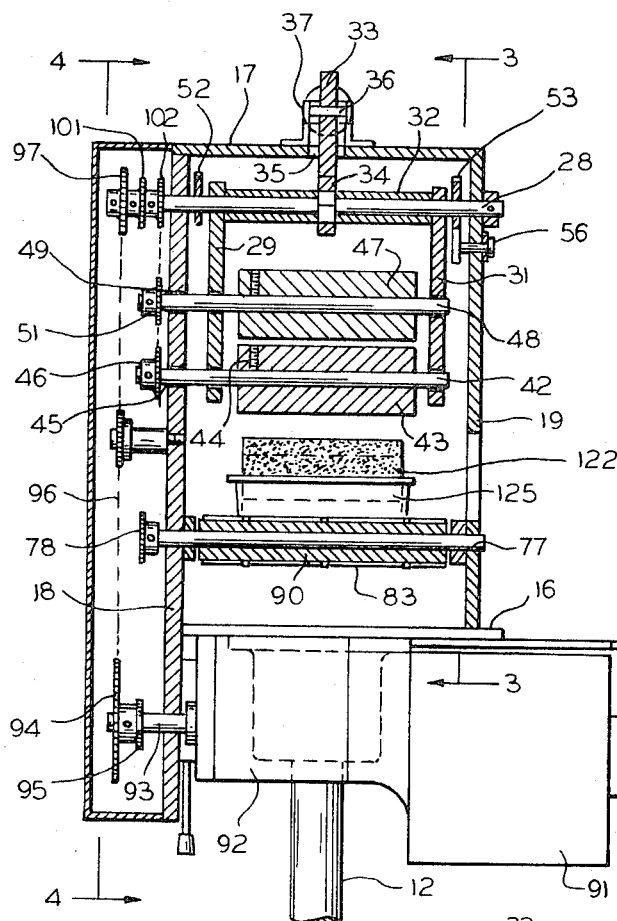
FIG. 2 is a sectional elevation view taken approximately along line 2—2 in FIG. 1.

The frame of rolling machine 10 further comprises two vertical mounting plates 18 and 19, both of which are affixed to base plate 16. The vertical mounting plates 18 and 19 are spaced from each other and extend upwardly from base plate 16 as best shown in FIG. 2. A top plate 17 extends across and joins the upper ends of plates 18 and 19. Plates 16–19 enclose a rolling station 20.

Rolling machine 10 is provided with an input conveyor 21 for conveying the articles to be rolled along a path generally indicated by the arrow A in FIGS. 1 and 3. Path A ends at a rolling location within the rolling station 20. Input conveyor 21 comprises a pair of side rails 22 that are affixed to and project outwardly of the vertical mounting plates 18 and 19. An idler pulley 23 is mounted at the outboard end of the side rails 22 and a drive pulley 24 is located at the other end of the conveyor 22. Drive pulley 24 is mounted upon a shaft 25 that extends between the two frame members 18 and 19 (see FIG. 1). A conveyor belt 26 extends around pulleys 23 and 24 and is utilized to convey articles along path A. The side rails 22 are so shaped that the inner terminal portion 27 of the conveyor is directed downwardly at an acute angle to the horizontal.

The principal operating components of rolling machine 10 are mounted at the rolling station 20 between the vertical frame members 18 and 19. In the top central portion of the rolling station, a gate pivot shaft 28 is mounted between the vertical frame members 18 and 19. Shaft 28 serves as a support for a gate yoke or support member comprising two spaced arms 29 and 31 that are joined together by a bearing tube 32; tube 32 is preferably welded to both of the arms 29 and 31. Shaft 28 extends through and supports bearing tube 32. A gate actuating lever 33 is clamped to tube 32 by an adjustable clamp 34. The upper end of lever 33 projects through an opening 35 in top plate 17 (FIGS. 2, 3) and is connected by a clevis pin 36 to a clevis 37. Clevis 37 is mounted upon the shaft 38 of a small air cylinder 39. Air cylinder 39 is mounted upon plate 17 by means of a pair of brackets 41 and a mounting pin 42.

The lower end of the movable support member formed by arms 29 and 31 of the gate yoke carries a shaft 42 upon which an initial power-driven shaping roller 43 is mounted. Roller 43 is affixed to shaft 42 by appropriate means, such as a set screw 44 (FIG. 2), so that roller 43 rotates in response to rotation of shaft 42. Shaft 42 extends beyond yoke arm 29 through an arcuate opening 45 in vertical mounting plate 18. A sprocket 46 is mounted upon the outboard end of shaft 42, as shown in FIGS. 2 and 4.

A second power-driven shaping roller 47 is mounted upon a shaft 48 that extends between yoke arms 29 and 31 above the initial shaping roller 43. Shaft 48, like shaft 42, extends through an arcuate opening 49 in vertical plate 18 and carries a sprocket 51 on the outboard end of the shaft.

In addition to supporting the support member comprising arms 29 and 31 and bearing tube 32, shaft 28 serves as a support for a pair of hold-down roller mounting arms 52 and 53 (FIG. 2). Arm 53 is of L-shaped configuration, as best seen in FIGS. 1 and 3. Each of the arms 52 and 53 projects out over the end of the input conveyor 21; a hold-down roller 54 is mounted upon a shaft 55 that extends between the two arms. The other end of the L-shaped arm 53 carries an adjusting screw 56 that projects through an arcuate slot 57 in vertical frame member 19 and can be utilized to adjust the arcuate position of arms 52 and 53, thereby adjusting the spacing of roller 54 above the inner end of input conveyor 21. As shown in FIG. 4, one end of shaft 55 projects through an arcuate slot 58 in vertical plate 18. A sprocket 59 is affixed to the outboard end of shaft 55.

A sensing switch 61 is mounted upon a support arm 62 by means of a clamp 63. The other end of support arm 62 extends through a mounting block 64 affixed to plate 17, and is clamped in position in the mounting block by means of a clamp screw 65. Switch 61 is provided with an elongated downwardly extending sensing arm 66 that projects out over the input conveyor 21 of rolling machine 10.

Rolling machine 10 is provided with a discharge and packaging conveyor comprising two conveyor sections 71 and 72. The first discharge conveyor section 71 comprises a pair of support plates 73 that support the shaft of an idler pulley 74 (FIG. 1). At the other end of conveyor section 71 there is a drive pulley 80 mounted on a shaft 75 that extends between the vertical mounting plates 18 and 19. Shaft 75 is extended beyond plate 18, as shown in FIG. 4, and has an idler cluster sprocket 76 affixed to its outboard end.

The second discharge conveyor section 72 includes a drive pulley 90 having a shaft 77 that extends between the vertical plates 18 and 19. One end of shaft 77 extends beyond plate 18 and carries a drive sprocket 78 (FIGS. 2 and 4). An idler pulley 79 is located at the other end of the discharge conveyor section 72, supported between a pair of side plates 81. A belt or chain 82 in the input section 71 of the discharge conveyor is maintained in position by pulleys 74 and 80 and driven through pulley 80; an appropriate belt or chain 83 is similarly incorporated in the second section 72 of the discharge conveyor.

The main drive for rolling machine 10 comprises a motor 91 with an adjustable speed drive unit 92 that is mounted below base plate 16 as shown in FIGS. 1 and 2. The drive unit 92 has an output shaft 93 that projects through a lower extension of vertical mounting plate 18 (FIGS. 2 and 4). Shaft 93 carries an outboard drive sprocket 94 and an inboard drive sprocket 95.

The outboard drive sprocket 94 is utilized in the drive for the power-driven rollers 43,47 and 54. Sprocket 94 is engaged by a chain 96 that extends around an idler sprocket 97 mounted on the outboard end of shaft 28. From pulley 97, as shown in FIG. 4, chain 96 extends around the sprocket 98 that is mounted upon the drive pulley shaft 25 for input conveyor 22. From sprocket 25 chain 96 continues around an idler sprocket 99 and back to sprocket 94.

There are two inboard sprockets 101 and 102 of corresponding size mounted upon the extension of shaft 28 beyond plate 18 (FIG. 2). Sprocket 101 is engaged by a drive chain 103 that also engages the drive sprocket 59 on the hold-down roller shaft 55. The inner sprocket 102 on shaft 28 is engaged by a chain 104 that also engages the sprockets 51 and 46 on the shafts 48 and 42 for shaping rollers 47 and 43, respectively.

A short shaft 105 mounted upon the lower part of vertical plate 18 carries an idler cluster sprocket 106 employed for reduction in chain tightening. The larger diameter portion of the cluster sprocket 106 is engaged by a chain 107 that also engages the small inner sprocket 95 on the main drive shaft 93. The smaller part of the cluster sprocket 106 is engaged by a chain 108 that also engages the large diameter section of the sprocket 76 on conveyor drive shaft 75. The smaller diameter portion of sprocket 76 is connected with the drive sprocket 78, on shaft 77 (FIGS. 2 and 4), by a chain 109.

The electrical controls for machine 10 are quite simple. They include a junction box 111 mounted upon a bracket 112 that is affixed to base plate 16 (FIG. 1). A power connection 113 is completed from junction box 111 to motor 91. There is also an electrical connection 114 from the junction box to sensing switch 61 and back to the operating circuit for a solenoid-actuated control valve 115. Valve 115 is provided with suitable air hose connections 116 to air cylinder 39 and is also connected to a compressor or other source of air under pressure (not shown).

In considering the operation of rolling machine 10, as illustrated in FIGS. 1–4, it is assumed that the machine is being employed to roll meat "birds." When the machine is started in operation, motor 91 is energized and remains energized at all times while operation is continued. The drive from motor 91 to the shaping and hold-down rollers 43, 47 and 54, afforded by chains 96, 103 and 104 (FIG. 4), rotates these rollers continuously in the directions indicated by the small arrows on the rollers in each of the figures. Thus, as seen in FIG. 1, the rollers 43, 47 and 54 are all rotated continuously in a clockwise direction. Chain 96 also affords a continuous drive for input conveyor 21, so that conveyor belt 26 is continuously driven in the direction indicated by arrow A. Moreover, chains 107–109 afford a continuous drive for both sections 71 and 72 of the discharge and packaging conveyor, operating the conveyor so that the upper surfaces of belts 82 and 83 both move in the direction of the arrow B (FIG. 1).

The input to the rolling machine, in FIGS. 1–4, is afforded by an in-feed means shown as an external conveyor 121. Conveyor 121 delivers a series of articles to be rolled to the machine input conveyor 21, preferably on a regular, spaced basis. In the drawings, the articles to be rolled are shown as individual steaks or meat patties 122, each carrying a wad of stuffing 123.

When the leading edge of an incoming steak, such as steak 122A (FIG. 1) reaches the rolling location in station 20, at the end of the terminal portion 27 of input conveyor 21, it is first engaged by the initial power driven shaping roller 43, which extends across and blocks the end of the input path A. Roller 43, due to its clockwise rotation, deflects the leading edge of steak 122A upwardly away from the end 27 of conveyor belt 26. As the leading edge of the steak is deflected upwardly, and as the steak continues to move into rolling station 20 along path A, the leading edge of the steak is engaged by the second power driven roller 47. Roller 47 serves as a guide to direct the leading edge of the steak back toward the stuffing 123A. That is, the leading edge of steak 122A is deflected by roller 47 in a direction backwardly along path A. The steak starts to wrap around stuffing 123A. As it does so, the leading edge of the steak comes into contact with hold-down roller 54. The hold-down roller guides the leading edge of the steak back downwardly toward the input conveyor 21, continuing the wrapping action and rolling the steak around the stuffing.

The spacing between the individual steak-and-stuffing articles, as they are fed into machine 10, is made such that the next article to be rolled engages the sensing arm 66 of switch 61 at about the time that the preceding steak 122A has been completely rolled around stuffing 123A. When the steak or stuffing engages arm 66, sensing switch 61 is actuated, changing the operating circuit for the solenoid control valve 115. Valve 115 operates to reverse the air connections to air cylinder 39, driving the air cylinder from the rolling position illustrated in FIG. 1 to the discharge position shown in FIG. 3. As a consequence, the yoke that supports the power driven rollers 43 and 47 is pivoted from its rolling position (FIG. 1) to its discharge position (FIG. 3), swinging the initial shaping roller 43 completely clear of the inner end of input conveyor 21.

When this operation has been effected, conveyor belt 26, by its continued movement, impels the completed rolled article 122A, 123A, from the rolling location at the end of the conveyor downwardly in the direction of the arrow C toward discharge conveyor 71, 72 (FIG. 3). On the conveyor, a tray or other package 125 receives the completed roll.

With continued operation of the machine, the next article to be rolled, steak 122 and stuffing 123, continues its inward movement along path A and clears sensing arm 66 of switch 61. When this occurs, the electrical control circuit for solenoid valve 115 is reset to its original condition and the solenoid valve again changes the air connections for cylinder 39. This causes cylinder 39 to be driven from the discharge position of FIG. 3 back to the rolling position of FIG. 1, leaving the machine ready to roll the next article.

From the foregoing description, it will be apparent that the initial power driven shaping roller 43, which normally extends across and blocks the input path A of the articles being rolled, continuously deflects the leading edge of each article entering rolling station 20 upwardly away from the path A. Rollers 47 and 54 afford a guide means that further deflects the leading edge of the article backwardly along path A and downwardly toward the input conveyor, turning the article back upon itself to form a roll. When the roll is completed, the discharge means comprising sensing switch 61, cylinder 39, and the support member 29, 31 for rollers 47 and 43 is actuated to displace the initial shaping roller 43 away from its rolling location at the end of conveyor belt 26, permitting conveyor 21 to discharge the completed rolled article from the rolling location onto the discharge and packaging conveyor 71,72.

For efficient and effective rolling operation, certain limitations should be observed with respect to the speeds of various operating components of machine 10, particularly input conveyor 21 and the shaping and guide rollers 43, 47 and 54. These members should all have the same surface speed. In a particular machine utilized for rolling meat "birds," as described above, a surface speed for the input conveyor and for the rollers of approximately 24 inches per second has been used, affording efficient and consistent working results.

Discharge conveyor 71,72, on the other hand, should have a speed adjusted to bring an appropriate package area to the discharge point (see FIG. 3) each time a new rolled article is completed. It may be necessary to change this speed to accommodate articles of different size or to compensate for any changes in the frequency with which articles are fed into the rolling machine. Small adjustments for lead or lag can be made by the machine operator in the placement of packages, such as tray 125, on conveyor 71.

An indexing drive, actuated by sensing switch 61, can be employed for the discharge and packaging conveyor 71, 72 if there is any substantial irregularity in the rate and spacing of articles delivered to the machine from the external source (conveyor 121). An indexing drive for the discharge conveyor is also desirable if the trays or other packages are to be placed on this conveyor automatically, without operator supervision. The indexing drive, in its most practical embodiment, will entail an additional motor, so that the main drive motor 91 no longer actuates the discharge and packaging conveyor, but this additional cost can be accepted, particularly for high speed operation or in circumstances where the rate of feed of articles to the machine is difficult to control.

Figure 5:
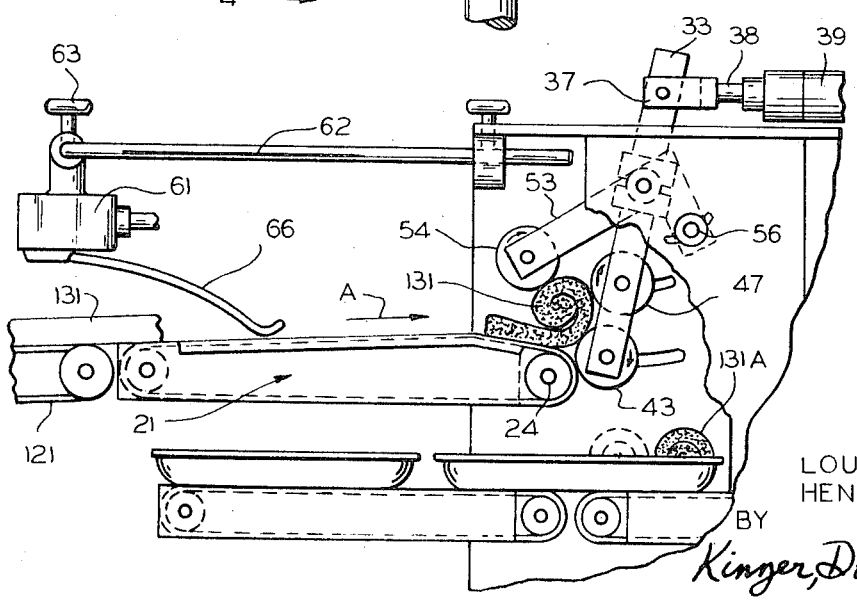
FIG. 5 is an elevation view, similar to FIG. 1, illustrating the processing of a different kind of article.

Rolling machine 10 is not limited to use with meat "birds" of the kind shown in FIGS. 1-4. It can be used to roll any type of pliable plastic material which has a relatively low memory factor. With material like a steak, for example, the machine can be utilized to roll a tubular shape, omitting the stuffing 123. On the other hand, and particularly with proper adjustment of the hold-down roller 154, rolling machine 10 can be utilized to roll even softer material, such as a wet towel 131, into a compact roll 131A as shown in FIG. 5. For any of these changes, it may be necessary to change the position of switch 61 or of its sensing arm 66 to assure effective operation of the gate means that permits discharge of the rolled articles from the machine.

We claim

1. A rolling machine for rolling flat, pliable articles of low memory factor, comprising:

an input conveyor for conveying the flat articles along a given path, at spaced intervals, into a rolling station;

a support member, movable between a normal rolling position and a discharge position;

a power-driven initial shaping roller, mounted on said support member, extending directly across and blocking said path at a rolling location, within said rolling station, immediately adjacent the inner end of the input conveyor when said support member is in its rolling position, for continuously deflecting the leading edge of a flat article entering the rolling station upwardly away from said path;

said initial shaping roller being displaced from the inner end of the input conveyor by a distance greater than the thickness of a completed rolled article when said support member is in its discharge position;

guide means for further deflecting the leading edge of the article backwardly along said path and downwardly toward said input conveyor to turn the article back upon itself and form a roll, said guide means comprising a second power-driven shaping roller mounted on said support member above said initial shaping roller;

and discharge means, comprising means to actuate said support member from its rolling position to its discharge position, for discharging a completed rolled article from said rolling station by continued action of said input conveyor.

2. A rolling machine according to claim 1, in which said guide means further comprises a hold-down roller, positioned above said input conveyor, rearwardly along said path from the inner end of said input conveyor, and means for adjusting the position of the hold-down roller relative to the input conveyor to adjust the tightness of the completed rolled article.

3. A rolling machine according to claim 2, in which said hold-down roller is a power driven roller, said rolling machine including drive means for driving said input conveyor, said initial shaping roller and said hold-down roller, all at the same surface speed.

4. A rolling machine according to claim 1, in which said discharge means further comprises a sensing switch located on said path ahead of said rolling location, for sensing the approach of an article along said input conveyor, and means, responsive to operation of said sensing switch, for actuating said support member to discharge position whenever approach of a new article is sensed.

5. A rolling machine according to claim 1, in which said guide means further comprises a power-driven hold-down roller, positioned above said input conveyor, rearwardly along said path from the inner end of said input conveyor.

6. A rolling machine according to claim 5, and further comprising means for adjusting the position of the hold-down roller relative to the input conveyor to adjust the tightness of the completed rolled article.

* * * * *